Figure 1:
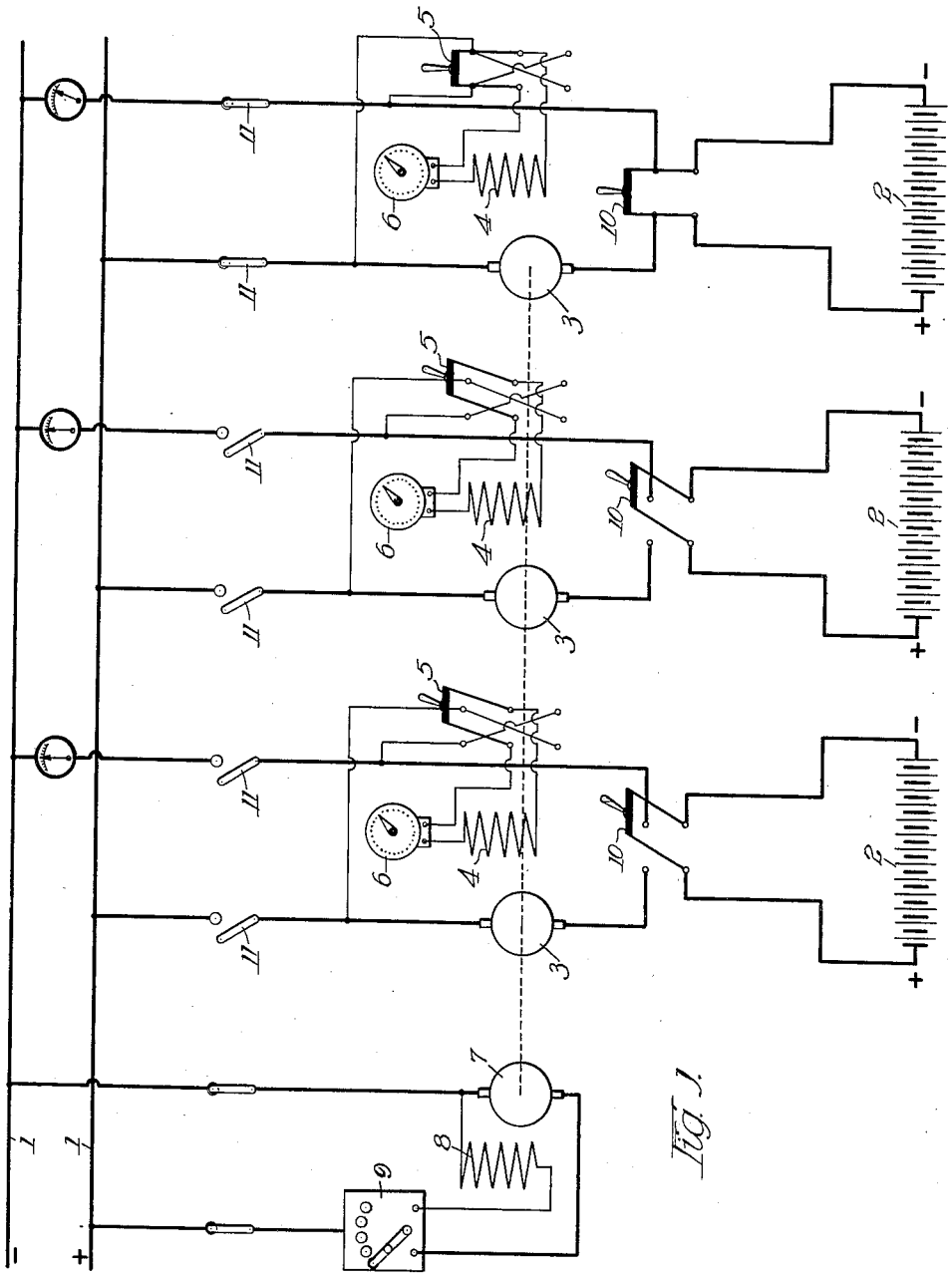

W. A. TURBAYNE.
SYSTEM OF CHARGING AND DISCHARGING STORAGE BATTERIES DURING FORMING PROCESS.
APPLICATION FILED NOV. 29, 1911.
1,132,986.
Patented Mar. 23, 1915.
2 SHEETS—SHEET 2.
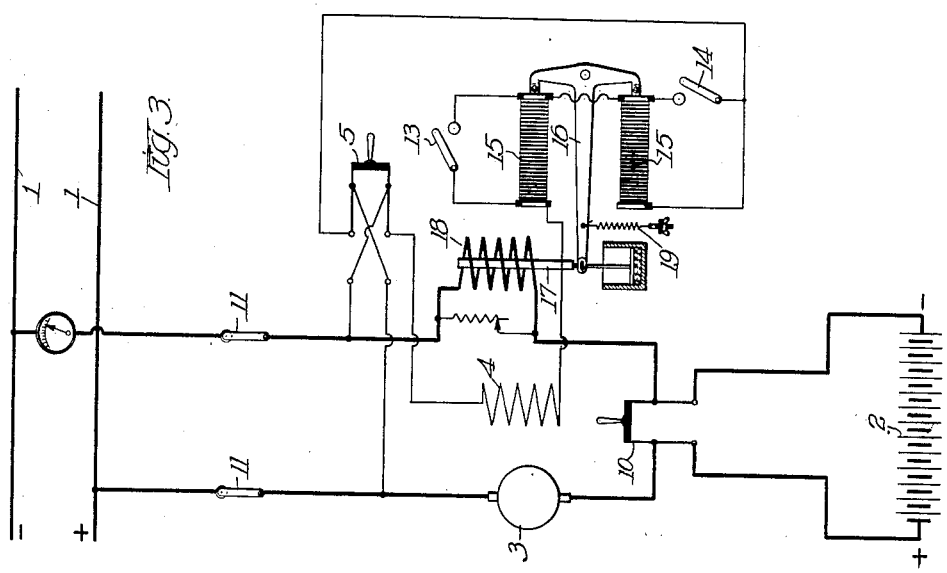
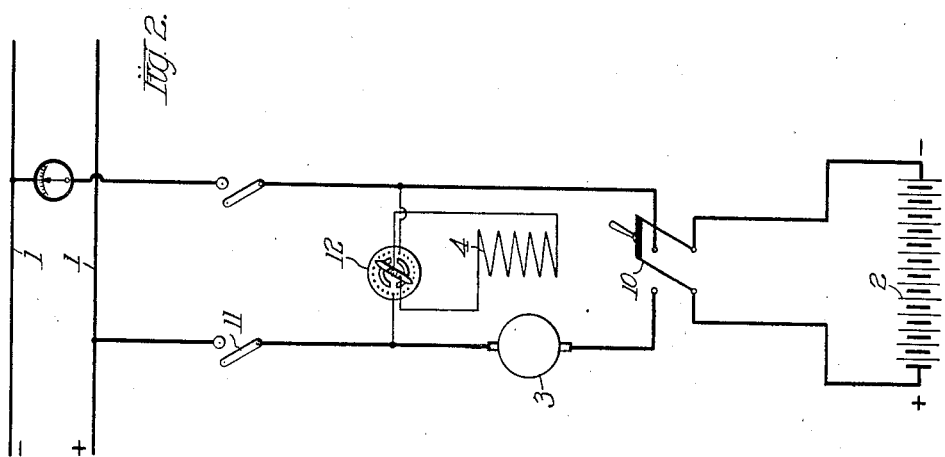

UNITED STATES PATENT OFFICE.

WILLIAM A. TURBAYNE, OF BUFFALO, NEW YORK, ASSIGNOR, BY MESNE ASSIGNMENTS, TO CENTRAL TRUST COMPANY OF NEW YORK, A CORPORATION OF NEW YORK, TRUSTEE.

SYSTEM OF CHARGING AND DISCHARGING STORAGE BATTERIES DURING FORMING PROCESS.

1,132,986.      Specification of Letters Patent.      Patented Mar. 23, 1915.

Application filed November 29, 1911. Serial No. 663,155.

*To all whom it may concern:*

Be it known that I, WILLIAM A. TURBAYNE, a citizen of the United States, residing at Buffalo, in the county of Erie and State of New York, have invented new and useful Improvements in Systems of Charging and Discharging Storage Batteries During Forming Process, of which the following is a full, clear, concise, and exact description, reference being had to the accompanying drawing, forming a part of this specification.

My invention relates to a system of charging and discharging, in the forming of storage battery plates.

The invention also relates to an automatic electric regulator for regulating the rate of charge and discharge.

The object of the invention is to provide a system which may be operated efficiently and thereby obviate the enormous waste of current heretofore incidental to the so-called forming process.

In carrying out the usual process, it has been the practice to stack together in vats green plates either of the Planté or pasted type. These vats are connected through a resistance,—for example, a water rheostat,—across any suitable source of electrical energy. In some cases they are connected across a 250-volt line. As these green plates, during the early stages of the formation process, develop substantially zero or little C. E. M. F., it is apparent that energy, represented by a predetermined charging rate of current at substantially full line voltage, must be absorbed in the rheostat, so that the forming circuit charged, for example, at a 100-ampere rate, will have a loss in its rheostat initially of practically 25 kilowatts. As the battery back pressure rises, the loss in the rheostat is reduced, while, of course, the useful energy utilized in the battery circuits increases. Manual adjustment of the rheostat permits the holding of the charging rate constant at the desired value during the forming process. According to one arrangement all Planté plates are first formed up as positives against blank lead electrodes, known as "dummies." In order to form negatives, the battery connections are reversed and the plates are formed up in the reverse direction against the same dummy electrodes. Upon reversal, substantially no C. E. M. F. exists until the previous formation is broken down and formation started in the other direction, so that under this condition again the rheostats must absorb current at full line voltage and for a much longer period than in the former case when green plates were under formation.

In the course of the development, the previously formed positive and negative plates are grouped in the usual manner and given a full charge, after which they are disconnected from the charging line and discharged through an adjustable resistance, causing an enormous waste of energy, particularly in plants where battery plates are formed in large quantities.

In accordance with the present invention, the above rheostats with their heavy losses will be eliminated, any difference between the battery and line voltage required to effectively charge or discharge the batteries being made up preferably by boosters, so that substantially the only losses will be those required to cover the internal losses of these machines.

The preferred arrangement of boosters and their connections is shown in the accompanying diagrams.

Figure 1 illustrates a number of batteries connected across a common charging line, each battery being provided with a booster and all the boosters being driven by a common motor. Fig. 2 illustrates a battery connected across a charging line and provided with a booster whose field regulation is accomplished by a reversible rheostat. Fig. 3 illustrates a battery connected across a charging line and provided with a booster, whose field winding is automatically regulated to control the rate of charge and discharge.

In the diagram marked Fig. 1 the mains 1 are adapted to supply current to the groups of battery plates or elements 2, which are undergoing the forming process. I have illustrated three groups, although a greater or less number may be employed. Each of these groups is connected across said mains with a booster 3 in series therewith. Each booster is provided with a field winding 4, the connections to which may be reversed by a reversing switch 5. Each booster is provided with an adjustable resistance 6 in its field circuit.

The boosters are all driven preferably by a single motor 7, which may be coupled directly thereto or adapted for belt connection therewith. The motor is provided with the usual shunt field winding 8 and starting resistance 9. Suitable switches 10 and 11 are provided for connecting the boosters and batteries with each other and across the line.

The above boosters are employed to regulate the charge or discharge of the batteries under the following three conditions met with in the manufacturing process:

First. When green plates are installed, and when consequently there is very little back pressure, any given booster will be excited in such a direction as to oppose or "buck" the line voltage. As the C. E. M. F. of the battery rises, the chaging current may be held constant by reducing the bucker voltage by means of its field rheostat. During the above operation the bucker is receiving energy from the line, and exerts torque in a motor direction and assists the motor 7, therefore, in driving the other units. If one booster only were connected to the motor instead of a plurality of boosters, said booster when running as a motor would drive the motor 7 as a generator, and thus restore energy to the line. As the C. E. M. F. of any one of the batteries approaches the voltage value across the charging source, the proper field switch 5 may be opened so that the corresponding bucker will not exert any C. E. M. F. When the charging current falls below the normal desired rate in the case of any or all batteries, the second condition is reached.

Second. The field resistance for a given bucker will now all be thrown in, and the switch 5 thrown over to the opposite position from that which it previously occupied, so that the bucker field will be excited in the opposite direction, and consequently voltage developed thereby will be added to that of the line. The booster now becomes a charging booster delivering the gradually increasing voltage required to force the normal charging current against the rising C. E. M. F. existing across the battery, the necessary adjustment being secured by manipuation of the field rheostat manually. In this manner the batteries can be brought to a fully charged condition.

Third. In order to discharge any one of the batteries, the appropriate switch 5 will be thrown in the reverse direction; that is to say, it will be returned to its original position, which will reverse the polarity of the booster, causing its voltage to be added to that of the battery, so that the battery will discharge back into the system. The value of the current on discharge can be held to the desired amount by the adjustment of the field rheostat.

With three batteries connected across the mains it is apparent that at any given time some of the boosters will probably be acting as buckers and, therefore, assist the motor in driving the remaining units. With a greater increased number of batteries connected across the line, the probabilities are that the various batteries will at any given time have reached different stages in the forming process. For this reason it will not be necessary for the motor to drive all the boosters simultaneously, because, as previously stated, some of the boosters will be assisting the motor. Consequently the motor will only need to be of moderate size sufficient to meet the average conditions.

In charging and discharging the battery illustrated in Fig. 2, the same results described above are secured by manipulation of the reversible rheostat 12, which combines the functions of both the rheostat and the reversible switch described in connection with the preceding arrangements.

In Fig. 3 I have illustrated a booster adapted to be automatically regulated to hold the charging and discharging current to a predetermined value. The booster field is adapted to have connected in series therewith by means of switches 13, 14, either one of two carbon pile resistances comprising a variable pressure rheostat 15. The carbon pile resistances have their pressure varied by a double bell crank lever 16 attached to a plunger 17, controlled by a solenoid 18 connected in series with the battery. The switch 5 is used to transpose the field terminal connections.

The operation of the automatic regulator is substantially as follows: The resistance of the upper carbon pile is normally a minimum and the resistance of the lower carbon pile is normally a maximum, due to the fact that the weight of the plunger 17 and associated parts, maintains them normally in lowermost position. This tendency may be assisted by use of a suitable spring 19, if desired.

Under the first condition referred to above, when it is desired to start with a relatively high bucker voltage and gradually reduce the same, the switch 13 is closed, thereby short circuiting the upper carbon pile. The switch 14 being left open, the lower carbon pile is effective, producing the desired regulation of the bucker field 4. The C. E. M. F. of the battery being negligible at the start, the energization of the current coil 18 is a maximum, whereupon the plunger 17 is drawn up and the resistance of the lower carbon pile 15 reduced by the increase of pressure thereon, so that the energization of the bucker field 4 is a maximum, thereby producing initially the desired maximum bucker C. E. M. F. As the C. E. M. F. of the battery rises the current flow through the same and through the winding 18 tends to be reduced, thereby increasing the resistance of the lower carbon pile 15, and correspondingly reducing the energization of the bucker field 4. As a result the bucker E. M. F. tends to diminish. Consequently, the voltage effective across the battery terminals tends to restore the charging current to the desired predetermined value. As a result the predetermined charging rate is maintained substantially constant automatically during the rising C. E. M. F. of the battery.

Under the second condition referred to above, with the switch 5 reversed and the bucker adding its voltage to that of the line, it is desired to increase the bucker voltage gradually in opposition to the increased C. E. M. F. of the battery. Accordingly, the switch 14 is closed to short circuit the lower carbon pile resistance and the switch 13 is opened to render effective the upper carbon pile resistance. This upper resistance is normally a minimum, but the charging current flowing from the line immediately energizes the winding 18 sufficiently to cause the plunger 17 to be lifted and insert considerable resistance in the booster field 4, thereby regulating the booster so that the voltage delivered thereby and added to the line voltage is a minimum. As the C. E. M. F. of the battery continues to rise, however, the tendency toward a diminution of the charging current tends to reduce the energization of the winding 18, thereby decreasing the upper carbon pile resistance and increasing the energization of the bucker field 4. The bucker voltage is accordingly increased gradually and maintains the desired charging rate in opposition to the increasing C. E. M. F. of the battery.

Under the third condition referred to above it is desired to discharge the battery. The switches 13 and 14 may be left the same as during the preceding operation. The switch 5, however, is again reversed and thereby restored to its original position, as previously explained in connection with the other regulators described. Accordingly, the booster field 4 will, at the start, be energized a minimum amount to cause the booster to develop a minimum voltage to be added to that of the battery, which begins its discharge at the maximum voltage. As the battery discharge continues, however, and it is desired to increase the booster voltage to be added to that of the battery, so that the discharge may be continued at the predetermined rate, the reduced energization of the winding 18 has the effect of increasing the energization of the field 4, whereby the desired increased voltage of the booster is obtained automatically.

By the use of the different forms of regulating apparatus such as described above, it is apparent that the batteries can be economically charged and discharged during manufacture, inasmuch as the boosters simply have to furnish the difference between the existing voltage of the charging source and that required to bring the batteries to a full charged or discharged condition. The form of regulating device illustrated in either of Figs. 2 and 3 may, of course, be substituted for any one of the regulating arrangements illustrated in Fig. 1, or different types of regulators may, of course, be connected across the same mains. The three different forms of regulator described have been selected simply for the purpose of illustrating various embodiments of the invention. It is apparent that various other embodiments may be devised which fall within the scope of the invention. I desire, therefore, to cover any suitable equivalent means for accomplishing the desired results and falling within the scope of the appended claims.

What I claim as new, and desire to secure by Letters Patent of the United States, is:

1. A regulating system for use in forming storage battery electrodes, comprising a constant voltage source, a dynamo electric machine provided with an armature adapted to be connected in series between said source and said battery electrodes, said dynamo electric machine having a variable field, and means for reversing the connections of said dynamo electric machine at will whereby said dynamo electric machine may act as a motor transforming the excess E. M. F. of said source into useful mechanical energy during the initial forming stages, and whereby said dynamo electric machine may act as a booster assisting said source or the C. E. M. F. of said battery electrodes during subsequent forming stages.

2. A system of electrical distribution for causing a uniform rate of charge and discharge of storage battery elements while undergoing the forming process, comprising a constant voltage source of supply, a dynamo electric machine with its armature connected in series with said source and its field connected across said source, mechanical connections adapted to drive said armature or to be driven thereby, and a reversing switch for said field whereby said dynamo electric machine may be caused to operate as a motor, transforming the excess E. M. F. of the supply line into useful energy when said elements are being charged and the C. E. M. F. thereof is low, and whereby said dynamo electric machine may be caused to operate as a booster assisting the voltage of said source to maintain the predetermined charging rate as said C. E. M. F. rises, or as a booster assisting said C. E. M. F. to maintain the predetermined discharge rate as the C. E. M. F. of said battery falls.

3. In combination, supply mains, a plurality of batteries connected across said mains to subject the elements thereof to the forming process, a booster in circuit with each of said batteries, a motor connected across said mains and mechanically connected to all of said boosters to drive the same, and means for reversing the polarity of any booster field, whereby any booster may run as a motor and restore energy to the system during certain stages of said forming process.

4. In a system of electrical distribution adapted for the process of forming battery elements, a supply circuit, a plurality of batteries connected across said circuit, a booster in series with each of said batteries, a common motor connected across said circuit for driving all of said boosters, means for reversing the polarity of each booster field, whereby when the C. E. M. F. of any battery is low, as in the initial stage of the forming process, the corresponding booster may be run as a bucker opposing the voltage of the supply circuit to hold down the charging current to a predetermined value, and whereby when the batteries approach a fully charged condition said field may be reversed to permit the booster to assist in maintaining the charging rate against the rising C. E. M. F. of the battery, and whereby, when it is desired to discharge said battery back into the system, said field is again reversed, causing the booster voltage to be added to that of the battery.

5. A system of regulation for charging and discharging operations in the forming process for battery elements, comprising supply mains, a battery connected across said mains, a booster provided with a shunt field connected in series between said battery and said mains, a variable resistance in series with the shunt field of said booster, a reversing switch operable at will for reversing the polarity of said field, and a reglating winding connected in series with said battery for regulating the booster voltage in accordance with variations in the battery voltage, whereby the battery charging current is maintained substantially constant.

6. An electric regulator for a system adapted to charge and discharge batteries in the forming process, comprising a booster adapted to be connected in series with said battery and having a shunt field winding, a reversing switch operable at will for reversing the polarity of said winding, whereby the voltage of said booster may be added to or opposed to the voltage of the battery, a variable pressure rheostat connected in series with said winding, a controlling winding connected in series with said battery for regulating said rheostat, whereby the voltage developed by said booster is just sufficient to make up the difference between the battery voltage and the voltage of the charging line under the varying conditions of C. E. M. F. developed by said battery during the forming process.

7. An electric regulator for a system adapted to charge and discharge batteries in the forming process, comprising a booster adapted to be connected in series with said battery and having a shunt field winding, a reversing switch for reversing the polarity of said winding, whereby the voltage of said booster may be added to or opposed to the voltage of the battery, a plurality of variable resistances arranged in series with said winding, means for short circuiting either of said resistances, whereby the remaining resistance alone is effective for regulating said shunt field winding, and a controlling winding connected in series with said battery for varying whichever of said resistances is effective.

8. A regulator for a dynamo, said regulator comprising two variable resistances either of which is adapted to be connected in series with the field winding of said dynamo, a controlling winding, and mechanical connections between said elements exerting opposite effects on said two resistances, whereby a given movement imparted to said mechanical connections by said controlling winding will produce opposite results in regulating the strength of said field, depending upon which resistance is connected in circuit.

9. In combination, a main charging line, a battery connected across the same, a booster connected in series with said battery, said booster having a shunt field winding, a controlling winding also in series with said battery, two carbon pile resistances controlled by said winding, and switches for connecting either of said resistances in series with said field, whereby only one resistance at a time may be rendered effective for regulating purposes, said resistances being so related to each other and to said controlling winding that an increased energization of said winding will act to increase one resistance and decrease the other, whereas, the decrease in the energization thereof will produce a reversed relative effect.

10. A regulator comprising two carbon pile resistances, either of which may be connected in series with the generator field winding to regulate the same, a double bell crank lever coöperating therewith to increase the pressure on one carbon pile and simultaneously decrease the pressure on the other carbon pile, and a controlling winding for operating said bell crank lever, whereby a movement of said bell crank lever in a given direction, in response to a given variation in the energization of said winding, will either increase or decrease the energization of said field winding, depending on which carbon pile resistance is connected in circuit therewith.

11. A system of electrical distribution adapted for forming storage battery electrodes, comprising a constant voltage source, a group of battery electrodes connected across said source, a dynamo electric machine in series with said battery electrodes, and means for causing said dynamo electric machine to successively operate as a motor operated by current from said source when the group of electrodes is charging and the C. E. M. F. thereof is low, as a generator assisting the voltage of said source when said group of electrodes is charging and the C. E. M. F. thereof is high, and as a generator assisting the voltage from said electrodes to maintain a predetermined rate i discharging said electrodes.

12. A system of electrical distribution for causing a uniform rate of charge and discharge of storage battery electrodes while undergoing the forming process, comprising a constant voltage source of supply, a plurality of branch circuits connected across said source, a dynamo electric machine for each branch provided with an armature in series with said branch, and a field connected across said branch, a driving motor mechanically connected to all of said armatures, independent means for regulating each dynamo electric machine, and a reversing switch for each field whereby said dynamo electric machines may be operated at will as motors to reduce the voltage in their respective branch circuits, the torque thereof assisting said driving motor, or as boosters driven by said driving motor to assist either the source or battery, depending on whether said batteries are charging or discharging.

13. The method of regulating the charge and discharge of battery electrodes while undergoing the forming process, which consists in connecting the electrodes to a constant voltage source, the voltage of which is below the voltage necessary to fully charge said electrodes, providing a regulating means in series with the electrodes, and varying the operation of said regulating means to cause it to increase the charging voltage as the battery charge progresses and assist the battery voltage sufficiently to overcome the voltage of the source as the electrodes are discharged to permit the complete discharge of the battery into the source.

14. A regulating system for use in forming storage battery electrodes including a constant voltage source and a single regulating means connected in series with said battery electrodes, said regulating means being provided with means whereby the regulator may assist the source to fully charge the batteries against the rising C. E. M. F. thereof and may assist the batteries to cause complete discharge thereof into said source.

15. In combination, a set of storage battery electrodes to be formed, a constant voltage source of supply, means for aiding said source to fully charge said electrodes against the rising C. E. M. F. thereof, and means whereby said first means may be caused to aid said electrodes to cause said electrodes to completely discharge back into said source.

16. In combination, a set of storage battery electrodes to be formed, a constant voltage source of supply, means for aiding said source to fully charge said electrodes against the rising C. E. M. F. thereof, and means whereby said first means may be caused to aid said electrodes to cause said electrodes to completely discharge back into said source, said first means having regulating means whereby it controls the rate of charge and discharge of said battery electrodes.

In witness whereof, I have hereunto subscribed my name in the presence of two witnesses.

WILLIAM A. TURBAYNE.

Witnesses:
W. L. BLISS,
C. C. CARPENTER.